(12) United States Patent
Lochmann et al.

(10) Patent No.: US 6,278,389 B1
(45) Date of Patent: Aug. 21, 2001

(54) SENSOR ARRANGEMENT WITH MEASUREMENT ERROR DETECTION

(75) Inventors: Hans-Ulrich Lochmann, Henstedt-Ulzburg; Stefan Pusch, Hamburg, both of (DE)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/211,926

(22) Filed: Dec. 15, 1998

(30) Foreign Application Priority Data

Dec. 22, 1997 (DE) .............................. 197 57 196

(51) Int. Cl.⁷ .................................................. H03M 1/06
(52) U.S. Cl. .......................................... 341/118; 341/155
(58) Field of Search .................................. 341/120, 150, 341/141, 155, 118

(56) References Cited

U.S. PATENT DOCUMENTS 4,937,443 * 6/1990 Smoot ................................. 250/221
5,012,124 * 4/1991 Hollaway ............................. 307/116

OTHER PUBLICATIONS

Philips Data Handbook SC17, Semiconductors Sensors, 1997, pp. 186–187.

* cited by examiner

Primary Examiner—Peguy JeanPierre

(57) ABSTRACT

A sensor arrangement comprising two sensors (1, 2) and processing unit (16) for deriving a measurement signal ($M_1$, $M_2$) from two sensor signals ($S_1$, $S_2$) which are each supplied by one sensor (1, 2). Such a sensor arrangement may comprise for example two angular-position sensors which measure the angular position of a measurement object with respect to the sensor arrangement. According to the invention, in order to enable detection of errors occurring in such a sensor arrangement, particularly at the input of the processing unit (16) during the conversion of the sensor signals in the A/D converter units (3, 4), switching means (11, 12) have been provided for switching to two switching states in such manner that in each switching state a sensor signal ($S_1$, $S_2$) is applied to each of the A/D converter units (3, 4) and that the allocation of the sensor signals ($S_1$, $S_2$) to the A/D converter units (3, 4) is different in the two switching states, and the processing unit (16) is constructed to derive an error signal (F) from two measurement signals ($M_1$, $M_2$) determined during each time one switching state.

9 Claims, 2 Drawing Sheets

SENSOR ARRANGEMENT WITH MEASUREMENT ERROR DETECTION

BACKGROUND OF THE INVENTION

The invention relates to a sensor arrangement comprising two sensors and a processing circuit, having two A/D converter units each receiving a sensor signal from one of the sensors to an angular-position sensor arrangement comprising two angular-position sensors which are angularly spaced from one another and a similar processing unit, and to a method of measurement-error detection for such a sensor arrangement.

Such a sensor arrangement is known from the Philips Data Handbook SC 17, Semiconductor Sensors, 1997, pages 186–187. In said arrangement two angular-position sensors are each connected to an A/D converter unit (A/D=analog/digital). The angular-position sensors, which each comprise four measuring elements in a bridge arrangement, are spaced at an angle of 45° from one another and each produce a sinusoidal sensor signal on the output. As a result of the angularly spaced arrangement these sensor signals are 90° phase-shifted. By means of a processing unit a measurement signal is determined, which is for example proportional to the angular position of a measurement object relative to the sensor arrangement.

It has been found that on the input of the processing unit, particularly during the A/D conversion of the sensor signals, errors can occur which invalidate the measurement signal to be determined without this being detectable from the measurement signal or the sensor signals in the known sensor arrangement. Such errors can be caused, for example, by a faulty A/D converter unit. Moreover, the sensors themselves may operate incorrectly.

BRIEF SUMMARY OF THE INVENTION

It is an object of the invention to take simple measures in order to detect such errors in the known sensor arrangement.

According to the invention this object is achieved by means of the sensor arrangement having two sensors connected through a switch to respective A/D converter units. In said arrangement, as in the known arrangement, a first measurement signal is calculated in a first switching state. However, in a second switching state the connections between the sensors and the A/D converter units are interchanged, so that each A/D converter unit receives the other sensor signal. In this switching state a second measurement signal is determined, which is then compared with the first measurement signal. This comparison yields an error signal which indicates whether an error occurs or not. The error criterion can then be, for example, the difference between the two measurement signals, for which a limit value can be defined. This effective solution for the detection of errors at the input of the processing unit is very cheap and in the simplest case it requires the provision of simple switching means between the two sensors and the two A/D converter units. Such switching means can be, for example, simple clock-pulse controlled switches or a multiplexer.

In a preferred embodiment, a memory stores the sensor signals processed in the first switching state, and furnishes them to the A/D units in the second switching state. This guarantees that the sensor signals processed by the A/D converter units in the second switching state do not differ from the sensor signals processed in the first switching state. Such memory means must be provided, for example, when the measurement quantity, for example the angular position of a measurement object, changes very rapidly. Conversely, when it can be guaranteed that the sensor signals do not change in the first and the second switching state, said memory means may be dispensed with.

In another embodiment, to enable errors in the processing unit to be detected as well, a second arithmetic unit is used in addition to the one arithmetic unit provided in the known sensor arrangement. It is possible, for example, to determine the first measurement signal by means of the first arithmetic unit and the second measurement signal by means of the second arithmetic unit in order to thereby detect errors in the arithmetic unit. It is also conceivable to first determine a first and a second measurement signal by means of the first arithmetic unit and then in a second step to determine again a first and a second measurement signal by means of the second arithmetic unit (from the same sensor signals as in the calculation by means of the first arithmetic unit) and subsequently to compare these.

Moreover, in a further embodiment, the sensor arrangement can be extended with a further sensor pair which is identical to the first sensor pair and whose sensor signals are processed in a third and a fourth switching state as a redundancy for the first sensor pair. This requires only a minor modification of the processing unit. The operation of the sensor arrangement is then sustained even in the event of failure of one sensor or a complete sensor pair.

The invention is particularly suitable for use in an angular-position sensor arrangement. The measurement-error detection method broadly covering all the above embodiments can also be used in any other sensor arrangement in which a measurement signal is derived from two sensor signals.

DETAILED DESCRIPTION OF THE INVENTION

Figure 1:
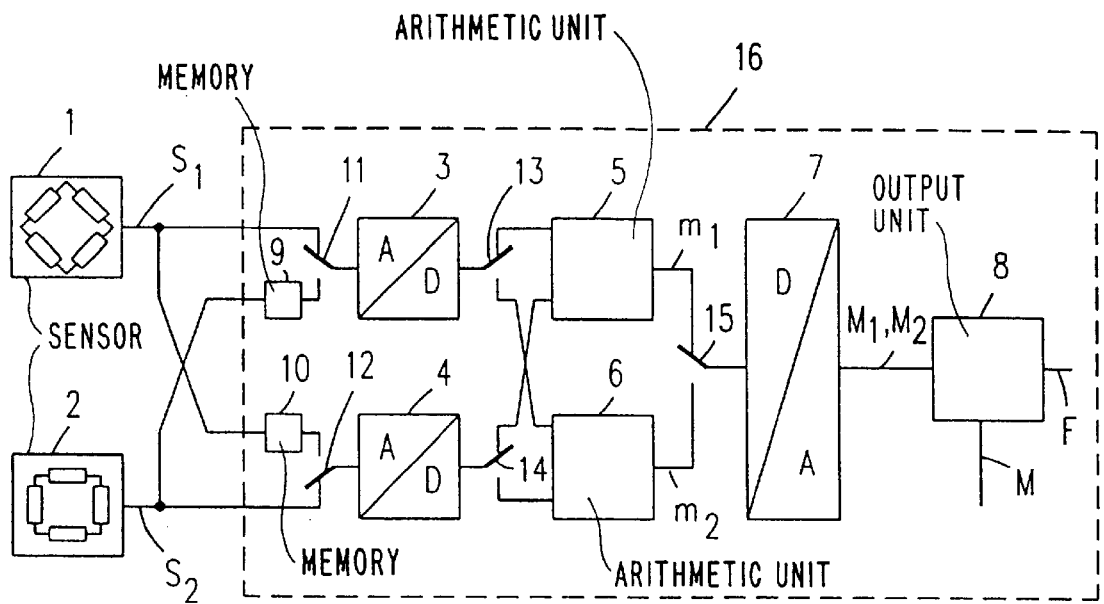
FIG. 1 shows a block diagram of an angular-position sensor arrangement in accordance with the invention.

FIG. 1 shows two angular-position sensors 1, 2 of the type described in the introductory part, which sensors supply two sensor signals $S_1$, $S_2$ which are 90° shifted in phase as a result of their angularly spaced arrangement. Preferably, the angular-position sensors 1, 2 are mounted on a chip housing adjacent one another or, as in the known arrangement, intermeshing. In a first switching state, in which all the switches 11 to 15 are in the positions shown, the sensor signal $S_1$ is applied to the A/D converter 3 and the sensor signal $S_2$ is applied to the A/D converter 4. The converted sensor signals are applied to the arithmetic unit 5, which derives a first measurement signal $m_1$ from these sensor signals. After D/A conversion in a D/A converter 7 the analog measurement signal $M_1$ is applied to the output unit 8, where it is initially stored. The measurement signal $M_1$ is now available as a voltage whose amplitude is dependent on the value of the measurement quantity to be measured, in the present case on the magnitude of the angle of rotation of the measurement object with respect to the angular-position sensors 1, 2.

Subsequently, all the switches 11 to 15 of the processing unit 16 are set to their positions (not shown) for the second switching state. The sensor signal $S_2$, which has been stored by means of a memory element 9, for example a sample-and-hold circuit, is then applied to the A/D converter 3 and the sensor signal $S_1$ stored in a memory element 10 is applied to the A/D converter 4. The storage in the memory elements 9, 10 is effected in such a manner that in the second switching state the same sensor signals $S_1$, $S_2$ as in the first switching state are processed. The converted sensor signals are now processed in the arithmetic unit 6, which determines a second measurement signal $m_2$, which after digital-to-analog conversion is also applied to the output unit 8 as an analog measurement signal $M_2$.

Upon comparison of the two measurement signals $M_1$, $M_2$ which appear at the output of this unit an alerting error signal F can be supplied when a given tolerance is exceeded, or when the tolerance is not exceeded, the output signal M can be for example the average value of the two measurement signals $M_1$, $M_2$ or can be formed directly by one of the two measurement signals $M_1$, $M_2$.

Figure 2:
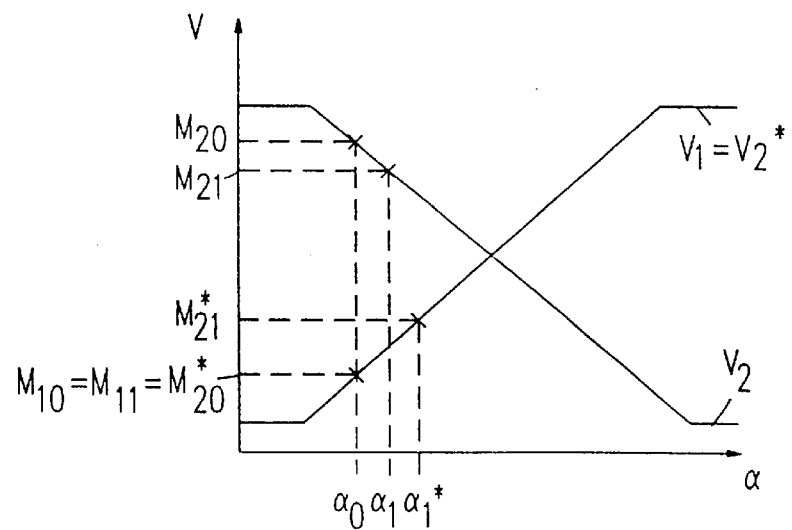
FIG. 2 is a diagram which represents output characteristics of a such an angular-position sensor arrangement.

The diagram in FIG. 2 shows characteristics of such an angular-position sensor arrangement, which represent the output voltage V as a function of the angle $\alpha$ to be measured. In the first switching state the angular-position sensor arrangement exhibits a characteristic $V_1$ and in the second switching state either a characteristic $V_2$ which is complementary to the characteristic $V_1$ or a characteristic $V_2^*$ which is identical to the characteristic $V_1$ is obtained depending on the polarity of the inputs of the arithmetic unit 6.

In the case of an angle $\alpha_0$ to be measured, when the processing unit operates correctly, for example a measurement value $M_{10}$ (measurement value=amplitude of the analog measurement signal) is obtained in the first switching state and a measurement value $M_{20}$ or $M_{20}^*$ in the second switching state. If the difference between $M_{10}$ and $M_{20}$ or $M_{20}^*$ is within a predetermined limit range no error occurs. However, in the case of an incorrectly operating processing unit the situation may arise that in the first switching state a measurement value $M_{11}$ is found which denotes an angle $\alpha_0$ whereas in the second switching state a totally different measurement value $M_{21}$ or $M_2^*$ is found, which denotes a completely different angle $\alpha_1$ or $\alpha_1^*$. The difference between these measurement values is then no longer within the defined tolerance range, so that an error signal F can be generated to indicate that the processing unit 16 operates incorrectly.

Figure 3:
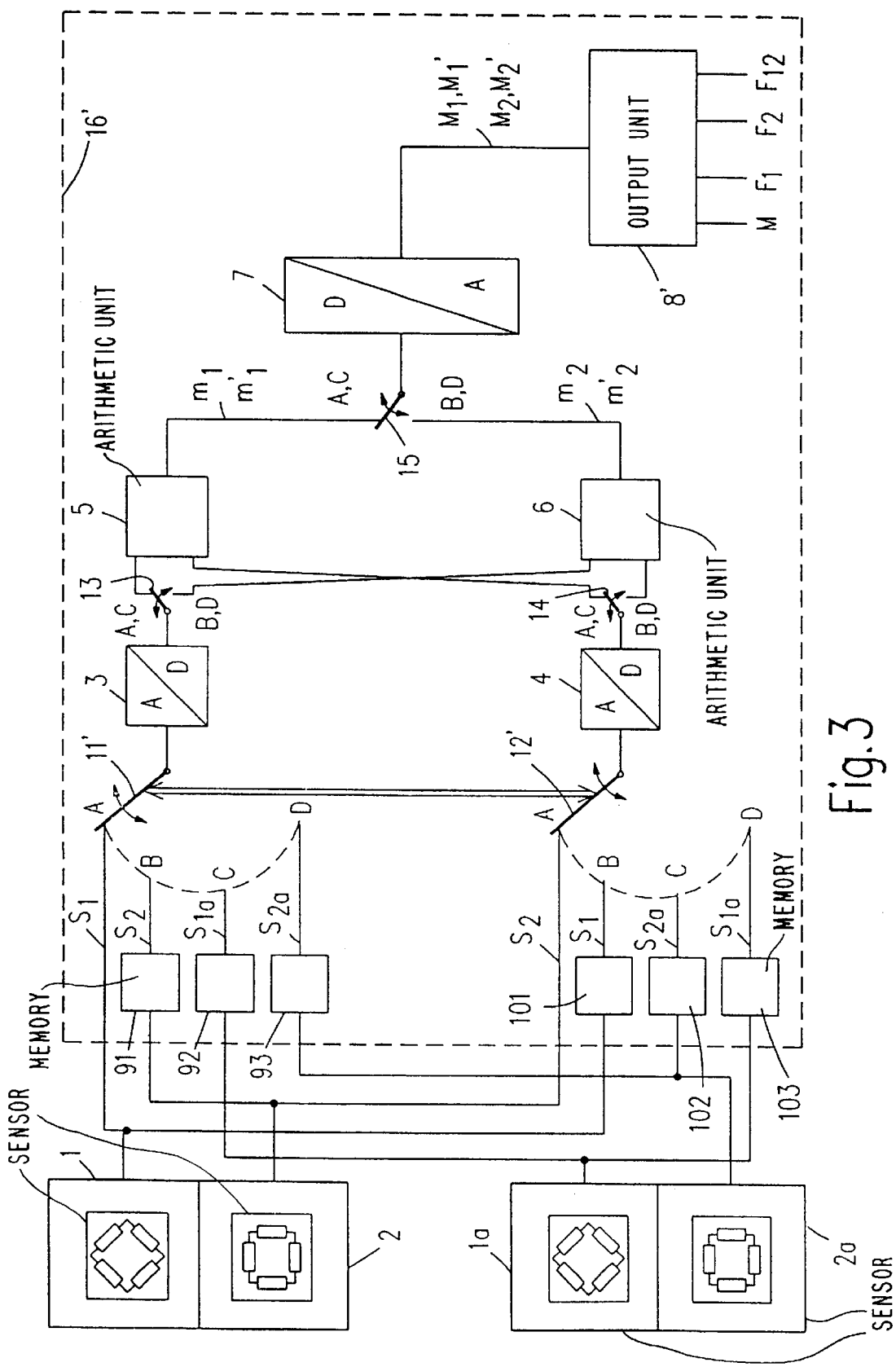
FIG. 3 shows a block diagram of an angular-position sensor arrangement comprising two sensor pairs.

In addition to said two sensors 1, 2 the angular-position sensor arrangement shown in FIG. 3 comprises two further sensors 1a, 2a identical to the sensors 1, 2. The switching means 11' and 12' are constructed in such a manner that four switching states A, B, C, D are obtained in succession, the sensor signals $S_1$, $S_2$ from the sensors 1, 2 being processed as described in the first two switching states A, B and yielding the measurement signals $M_1$, $M_2$, and the sensor signals $S_{1a}$, $S_{2a}$ from the sensors 1a, 2a being processed as described in the two further switching states C, D and yielding the measurement signals $M_1'$, $M_2'$. For this purpose, the switches 13, 14, 15 are switched accordingly. In order to process simultaneously measured sensor signals in all the switching states appropriate memory means 91 to 93 and 101 to 103 have been provided.

The output unit can now give various error signals. An error signal $F_1$, indicates that an error has occurred in the processing of the sensor signals $S_1$, $S_2$ ($F_1$ corresponds to the error signal F in FIG. 1). A corresponding error signal $F_2$ can indicate an error in the processing of the sensor signals $S_{1a}$, $S_{2a}$. An error signal $F_{12}$ can be generated from the comparison of the measurement signals $M_1$, $M_2$ with the measurement signals $M_2$, $M_2'$, for example from the comparison of the two average values, in order to detect in this way a failure of one of the sensors 2, 1a, 2a. In the present case the output value is again the required measurement value M, which can for example be the average value of all the four measurement signals.

The invention can also be used in conjunction with other sensors, some of which are now mentioned by way of example:

a) In the flow measurement technique two sensors are used for measuring the flow rate, the first sensor measuring the acoustic velocity of the flowing medium and the flow velocity and the second sensor, which is arranged in the "flow shadow", only measuring the acoustic velocity.

b) For temperature compensation in a circuit two sensors can be used, one sensor measuring the temperature-dependent measurement quantity and the other sensor only measuring the temperature.

c) For differential pressure measurement two pressure sensors can be used.

What is claimed is:

1. A sensor arrangement comprising two sensors supplying respective sensor signals, and a processing unit having two A/D converter units at an input side of the processing unit, for deriving a measurement signal from the respective sensor signals, characterized in that the sensor arrangement further comprises switching means arranged between said sensors and said A/D converter units, for switching between first and second switching states in such manner that in each switching state a sensor signal is applied to each of the A/D converter units and that the allocation of the sensor signals to the A/D converter units is different in the two switching states, and said processing unit derives a first measurement signal during the first switching state, and a second measurement signal during the second switching state, and derives an error signal from said first and second measurement signals.

2. A sensor arrangement as claimed in claim 1, characterized in that the arrangement further comprises two further sensors each supplying a respective sensor signal, the switching means is constructed to switch to two further switching states in such a manner that in the further switching states the sensor signals of the two further sensors are processed, and the processing unit derives four measurement signals respectively determined during each of the four switching states.

3. A sensor arrangement as claimed in claim 1, characterized in that the processing unit comprises two arithmetic units arranged after the A/D units, and further switching means to switch connections between the A/D converter units and the arithmetic units in such a manner that in the first switching state both A/D converter units are connected to a first of the two arithmetic units, and in the second switching state both A/D converter units are connected to the other of the two arithmetic units.

4. A sensor arrangement as claimed in claim 1, characterized in that that in the first switching state one of the sensor signals is applied to a first of the two A/D converter units and the other of the sensor signals is applied to the other of the A/D converters; and in the second switching state said one of the sensor signals is applied to said other of the A/D converters, and said other of the sensor signals is applied to said first of the two A/D converter units.

5. A sensor arrangement as claimed in claim 1, characterized in that the arrangement further comprises memory means for storing said one of the sensor signals and said other of the sensor signals, and the switching means is arranged in such a manner that, in the second switching state, the respective stored sensor signals are applied to the A/D converter units.

6. A sensor arrangement as claimed in claim 5, characterized in that the processing unit comprises two arithmetic units arranged after the A/D units, and further switching means to switch connections between the A/D converter units and the arithmetic units in such a manner that in the first switching state both A/D converter units are connected to a first of the two arithmetic units, and in the second switching state both A/D converter units are connected to the other of the two arithmetic units.

7. An angular-position sensor arrangement comprising two angular-position sensors which are angularly spaced from one another, supplying respective sensor signals, and a processing unit having two A/D converter units at an input side of the processing unit, for deriving a measurement signal from the respective sensor signals, characterized in that the sensor arrangement further comprises switching means arranged between said angular-position sensors and said A/D converter units, for switching between first and second switching states in such manner that in each switching state a sensor signal is applied to each of the A/D converter units and that the allocation of the sensor signals to the A/D converter units is different in the two switching states, and said processing unit derives a first measurement signal during the first switching state, and a second measurement signal during the second switching state and derives an error signal from said first and second measurement signals.

8. A sensor arrangement as claimed in claim 7, characterized in that that in the first switching state one of the sensor signals is applied to a first of the two A/D converter units and the other of the sensor signals is applied to the other of the A/D converters; and in the second switching state said one of the sensor signals is applied to said other of the A/D converters, and said other of the sensor signals is applied to said first of the two A/D converter units.

9. A method of measurement-error detection in a sensor arrangement in which a measurement signal ($M_1$, $M_2$) is derived from two sensor signals ($S_1$, $S_2$) by means of a processing unit (16) comprising two A/D converter units (3, 4), characterized in that the two sensor signals ($S_1$, $S_2$) are converted by means of one A/D converter (3, 4), a first measurement signal ($M_1$) is derived from the output signals of said A/D converter units, the two sensor signals ($S_1$, $S_2$) are converted by means of the other A/D converter unit (4, 3), a second measurement signal ($M_2$) is derived from their output signals, and an error signal (F) is derived from the two measurement signals ($M_1$, $M_2$).

* * * * *